March 19, 1935.  J. S. EDWARDS  1,994,855
DROP WHEEL FOR SEMITRAILERS
Filed Nov. 24, 1933   2 Sheets-Sheet 1
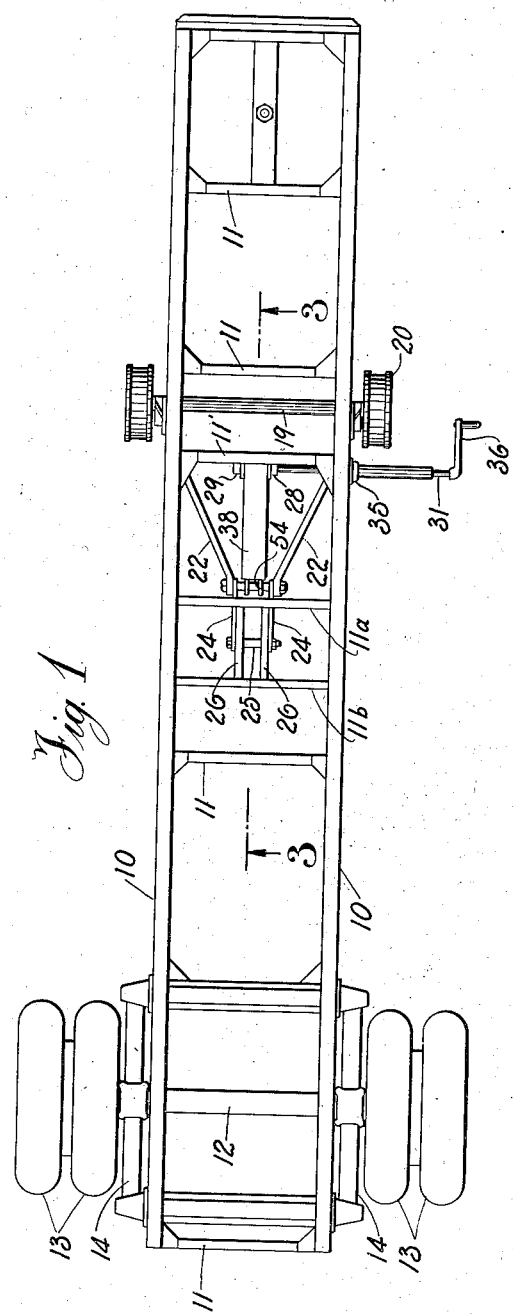
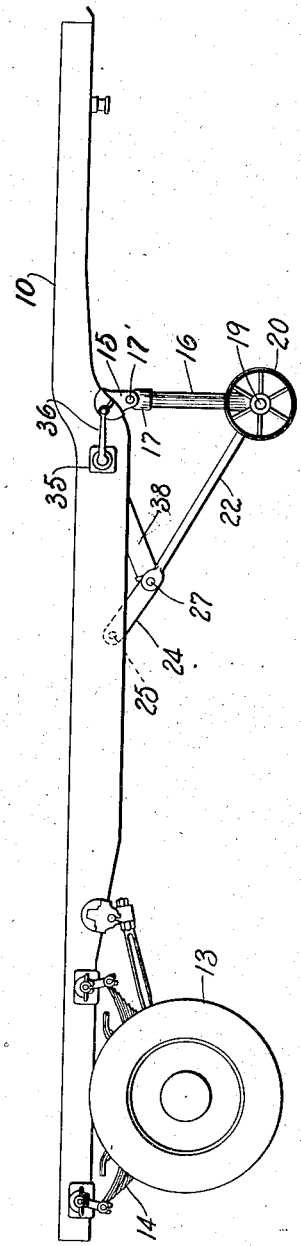

March 19, 1935.　　　　J. S. EDWARDS　　　　1,994,855
DROP WHEEL FOR SEMITRAILERS
Filed Nov. 24, 1933　　　2 Sheets-Sheet 2
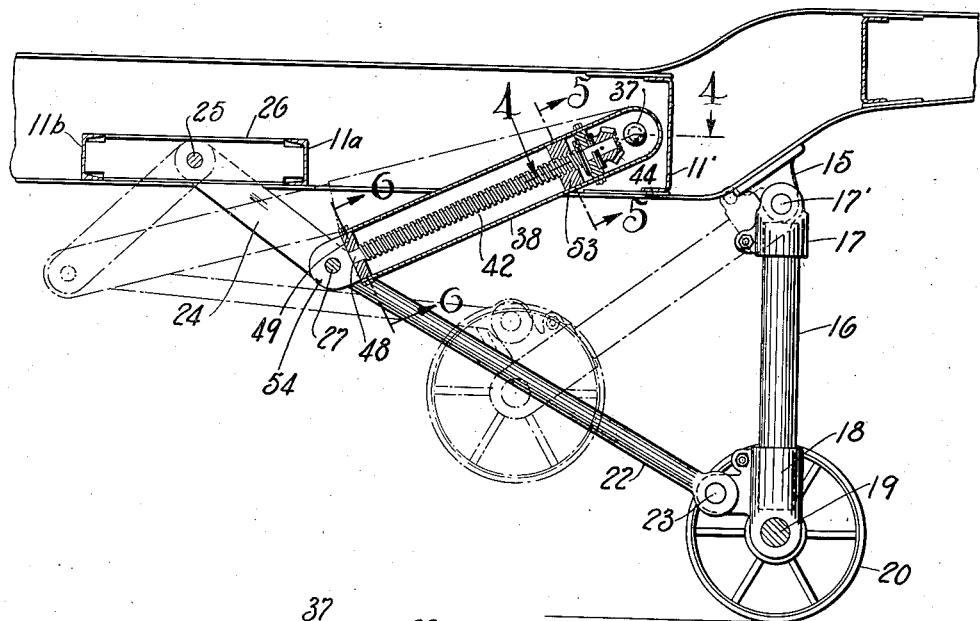
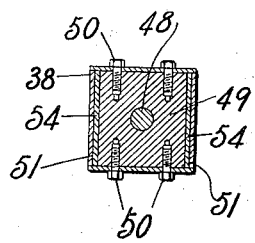
INVENTOR.
BY John S. Edwards
ATTORNEYS.

Patented Mar. 19, 1935

1,994,855

UNITED STATES PATENT OFFICE 1,994,855

DROP WHEEL FOR SEMITRAILERS

John S. Edwards, South Bend, Ind., assignor to Edwards Iron Works, Incorporated, South Bend, Ind., a corporation of Indiana Application November 24, 1933, Serial No. 699,518

9 Claims. (Cl. 280—33.1)

This invention relates to semi-trailers and more particularly to the landing gear or drop wheels used in conjunction therewith for supporting the trailer when the same is detached from its power source.

The principal object is to provide a mechanism whereby the drop wheels may be readily moved from folded or inoperative position into operative or working position under the influence of the working force imposed thereon with the minimum of effort on the part of the operator.

A further object is to provide a landing gear when in operative or working position that affords a rigidly braced frame extending from the trailer to the ground and which is constructed with the minimum number of parts and pivotal connections.

A still further object is to provide a mechanism which can readily be folded or compacted when not in use and which will be held in such folded position without vibrations and rattles.

Other objects and objects relating to details of construction and methods of operation will be apparent from the detailed description to follow:

In the accompanying drawings which illustrate a suitable embodiment of my invention and in which like numerals refer to like parts throughout the several views, Fig. 1 is a top plan view of the semi-trailer embodying my invention.

Fig. 2 is a side elevational view of a semi-trailer, showing the drop wheels in operative position.

Fig. 3 is an enlarged detailed fragmentary sectional view taken on the line 3—3 of Fig. 1, showing the landing gear in full lines for operative position and in dotted lines for folded or inoperative position.

Fig. 4 is a detailed sectional view taken on the line 4—4 of Fig. 3, showing a portion of the operating screw and the means for rotating the same.

Fig. 5 is a transverse sectional view taken on the line 5—5 of Fig. 3, and

Fig. 6 is also a detailed transverse sectional view taken on the line 6—6 of Fig. 3.

The trailer shown in the drawings for illustrative purposes has side frame members 10 suitably connected with cross frame members 11, 11', 11a, 11b and a rear axle 12 carrying road wheels 13 suitably connected with the frame by springs 14. As the trailer construction may be of any standard and approved design and as the same forms no part of my invention, except in conjunction with the landing gear wheels therefor, a further detailed discussion of the same is not thought necessary.

The landing gear by which the forward end of the trailer is supported when the trailer is detached from its source of power such as a tractor, includes brackets 15 suitably secured to each of the frame side members 10 which are pivotally connected at 17' to the couplings 17 which are suitably secured to the depending legs 16. Couplings 18 at the lower ends of the legs 16 having bearings therein receive an axle or shaft 19 which has a pair of spaced landing or road wheels 20 rotatably mounted thereon. A toggle comprising a pair of links 22 pivotally connected at one end to the couplings 18 at 23 and a second pair of links 24 pivotally connected to a shaft 25 journaled in the channel members 26 extending between the frame cross members 11a and 11b, braces the legs 16 and the wheels 20 carried thereby when in extended or operative position. The adjacent ends of the respective pairs of links 22 and 24 are pivotally connected on the shaft 27, thus forming the knee of the toggle comprised of those respective links.

A pair of spaced brackets 28 and 29, as clearly illustrated in Fig. 4, are secured in any suitable manner as by bolts 30 to the frame cross member 11'. A shaft 31 having a beveled gear 32 secured to the inner end thereof as by a pin 33 extends transversely of the vehicle frame and is suitably journaled in a bushing 34 in the bracket 28 adjacent to the inner end thereof and in a bearing 35 attached to one of the side frame members 10, thus providing suitable spaced journals therefor.

The shaft 31 has a handle 36 secured to the outer end thereof whereby rotation of the handle will rotate the gear 32, to operate the mechanism for swinging the landing wheels 20 to operative or inoperative positions. The bracket 29 has a pin or stud 37 secured therein which, with the shaft 31, forms a pivotal support for the casing 38 which is preferably rectangular in cross section, as illustrated in Figs. 5 and 6, having a top, bottom and side member suitably secured together as by rivets, bolts or by welding if so desired. This casing 38 has a partition 40 secured in its forward end as by the screws 41, which forms a bearing member with an aperture therethrough to receive the screw 42. The screw 42 is reduced to provide a shaft 43 which extends through the bearing member 40 and has a beveled gear 44 secured to the end thereof in mesh with the beveled gear 32 on the shaft 31.

A thrust bearing 45 is mounted on the shaft 43 between the screw 42 and the bearing member 40 and a second thrust bearing 46 is mounted between the bearing member 40 and the shoulder formed on the beveled gear 44. Due to the fact that the beveled gear 44 is in mesh with the beveled gear 32 secured to the shaft 31, rotation of the handle 36 will affect the rotation of the screw 42 for a purpose to be hereinafter described. The rear end of the screw 42 is also reduced to form a stub shaft 48 which is journaled in the block or bearing member 49 suitably secured in the rear end of the casing 38 by the screws 50. The bearing member 49 is of less width than the casing 38 to provide slots 51 between it and the side walls of the casing, also for a purpose to be hereinafter described.

A nut 53 non-rotatably mounted on the screw 42 but adapted to be moved longitudinally therealong, has secured to it at each side thereof a pair of bars 54, as by the screws 55. The bars 54 extend from the nut 53 beyond the casing 38 through the slots 51 formed between the bearing member 49 and the side walls of the casing 38 and are pivotally connected with the shaft 27 which also connects the adjacent ends of the pairs of links 22 and 24. It will be seen from the above description that as the handle 36 is rotated, the screw 42 will be caused to be rotated therewith by the beveled gears 44 and 32, thus moving the nut 53 fore and aft along the screw 42, depending on the direction of rotation thereof.

Referring particularly to Figs. 3 and 4, as the shaft 31 is rotated in a counter clockwise direction, the screw 42 will be caused to move in a clockwise direction, thus moving the nut 53 rearwardly and with it the bars 54, thus shifting the shaft 27 from the position illustrated in full lines in Fig. 3 toward the position illustrated in dotted lines so as to break the knee of the toggle formed by the pairs of links 22 and 24 and thereby raise the ground wheels 20 from the operative position to the inoperative position. It will also be evident that as the handle 36 is rotated in a clockwise direction to move the ground wheels 20 from the position shown in dotted lines in Fig. 3, toward ground engaging position, that the links 22 and 24 forming the toggle will approach a straight line, so that as the load is applied to the wheels 20 to lift the semi-trailer from its hitch with the vehicle forming its source of power, the greatest leverage will be applied against the wheels when they are about in fully extended operative position. This is done without adding undue friction and force to the screw 42 and the operating members associated therewith.

From the foregoing description it will be apparent that I have provided operating means for the drop wheels for semi-trailers which consists of a minimum number of parts, which are easy to operate, and which with the toggle forming the brace member for the ground wheels are effective in accomplishing the result sought.

While I have shown one modification of my invention, it is understood that the drawings and description are to be taken as illustrative only and that various changes in details of construction and method of operation may be resorted to without departing from the spirit and substance of my invention, the scope of which is to be measured entirely by the sub-joined claims.

What I claim is:

1. In a semi-trailer, a depending support therefor pivotally connected to the trailer frame, a toggle pivotally connected at one end to said support and at the opposite end to said frame, and means to swing said support to operative and inoperative positions comprising, a casing pivotally supported by said frame, a screw rotatably mounted within said casing, a nut operated by said screw, and a pair of bars rigidly connected with said nut having ends projecting beyond said casing pivotally connected with the knee of said toggle.

2. In a semi-trailer, depending support therefor pivotally connected to the trailer frame, a toggle comprising a pair of members the combined length of which is greater than said support pivotally connected at one end to said support and at the opposite end to said frame, and means for swinging said support to operative and inoperative positions comprising, a casing pivotally supported by said frame, a screw rotatably mounted in said casing, a nut on said screw, and a pair of bars slidable relative to said casing attached to said nut and pivotally connected with the knee of said toggle.

3. In a semi-trailer, a depending support therefor pivotally connected to the trailer frame, a toggle pivotally connected to one end of said support and at the opposite end to said frame, and means to swing said support to operative and inoperative positions comprising, a casing pivotally supported by said frame, a screw rotatably mounted but axially immovable within said casing, a gear on said screw, means cooperating with said gear for rotating said screw, a nut operated by said screw, and means rigidly connected with said nut extending outside of said casing pivotally connected at its outer end with the knee of said toggle whereby rotation of said screw will swing said support to operative and inoperative positions.

4. In a semi-trailer, a depending support therefor pivotally connected to the trailer frame to swing to operative and inoperative positions, a pair of links each pivotally connected to said support extending outwardly therefrom, a pair of links each pivoted at one end to the outward end of said first links and at the opposite end to said frame, a casing pivotally supported at one end to said frame, a screw rotatably supported within said casing, a pair of bars pivotally connecting with the connecting end of said first and second links, and a nut attached to said bars adapted to be actuated by said screw whereby rotation of said screw will swing said support to operative and inoperative positions.

5. In a semi-trailer, a depending support therefor pivotally connected to the trailer frame, means to swing said support to operative and inoperative positions comprising, a casing pivotally supported by said frame, a screw having journals at the opposite end thereof rotatably supported within said casing, a nut operated by said screw, a link pivotally connected to said support, a link pivotally connected to said frame, and means connected with the adjacent ends of said links and said nut movable to swing said support to said operative or inoperative positions upon rotation of said screw.

6. In a semi-trailer, a depending support therefor pivotally connected to the trailer frame, a toggle pivotally connected at one end to said support and at the opposite end to said frame, and means to swing said support to operative and inoperative positions comprising, a casing pivotally supported by said trailer frame, a pair of bars extending from said casing pivotally connected with the knee of said toggle, a screw rotatably mounted within said casing, and a nut fixed against rotation within said casing operated by said screw attached to said bars, whereby rotation of said screw will effect a longitudinal pull on said bars to swing said support from inoperative to operative position.

7. In a semi-trailer, a depending support therefor pivotally connected to the trailer frame, a toggle pivotally connected at one end to said support and at the opposite end to said frame, and means to swing said support to operative and inoperative positions comprising, a casing pivotally supported by said frame, a screw rotatably mounted within said casing, a nut fixed against rotation within said casing operated by said screw to move longitudinally therealong, and means movable with said nut extending beyond said casing connected with said toggle.

8. In a semi-trailer, a depending support therefor pivotally connected to the trailer frame, a toggle pivotally connected at one end to said support and at the opposite end to said frame, and means to swing said support to operative and inoperative positions comprising, a casing pivotally supported by said frame forwardly of said toggle, a screw rotatably mounted within said casing, a nut fixed against rotation within said casing operated by said screw to move longitudinally within said casing, and means movable with said nut extending beyond said casing connected with said toggle intermediate the ends thereof.

9. In a semi-trailer, a depending support therefor pivotally connected to the trailer frame, means to swing said support to operative and inoperative positions comprising, a casing pivotally supported by said frame, a screw rotatably supported within said casing, a nut fixed against rotation within said casing movable longitudinally by said screw, a link pivotally connected to said support, a link pivotally connected to said frame, and means connected with said links and nut movable to swing said support to said operative or inoperative positions upon rotation of said screw.

JOHN S. EDWARDS.